United States Patent Office 3,264,286
Patented August 2, 1966

3,264,286
NOVEL STEROIDAL [17,16-d]-2',6'-DIAMINO-PYRIMIDINES
Theodore J. Foell, King of Prussia, and Leland L. Smith, Malvern, Pa., assignors to American Home Products Corporation, New York, N.Y., a corporation of Delaware
No Drawing. Filed Oct. 11, 1962, Ser. No. 230,008
5 Claims. (Cl. 260—239.5)

This invention relates in general to certain new and novel steroidal [17,16-d]-2',6'-diaminopyrimidines, methods for their manufacture and their use as therapeutically active agents.

More particularly, the invention relates to the discovery of a novel class of steroidal [17,16-d]-2',6'-diaminopyrimidines of the general formula:

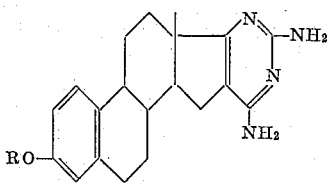

and the acid addition salts thereof wherein R in the above formula is representative of hydrogen, lower alkyl, lower akyenyl, cycloalkyl, aryl, lower aralkyl or acyl. The term "lower alkyl" can therefore embrace such radicals as methyl, ethyl, butyl, isobutyl, pentyl, hexyl and the like, although methyl is the lower alkyl radical preferred. In general the term "lower alkyl" as employed refers to those alkyl groups having from about 1 to 20 carbon atoms and more particularly to those having less than about 10 carbon atoms. The alkyl group may be normal or branched in structure, although the normal chain is generally preferred.

The term "cycloalkyl" refers to that substituent wherein the carbon atoms are joined in a carbocyclic ring which is generally a 5 or 6 membered ring but which may contain a smaller or larger number of carbon atoms subject to the practical limit of stability. A preferred member of this class of substituent would be cyclohexyl. The term "acyl" as employed herein refers in general to the mono-, di- or polycarboxy acid radical derived from a saturated or unsaturated organic acid by removal of a hydroxyl group. Such radicals therefore as the lower alkanoyl radicals of corresponding acids such as those from such aliphatic acids as acetic, propionic and butyric and aroyl radicals, preferably those derived from arylcarboxylic acids such as benzoic are to be included within the scope of this class of substituent. By the term "lower alkenyl" as it is employed herein, it is intended to refer to those unsaturated hydrocarbon radicals containing at least one double bond in the chain, such as allyl, vinyl and the like preferably containing less than about 10 carbon atoms therein.

The term "aryl" refers to an organic radical derived from an aromatic hydrocarbon by the removal of a hydrogen atom, more particularly such benzenoid structures as phenyl, tolyl and the like. The term "lower aralkyl" on the other hand refers in general to an alkyl group substituted by an aromatic ring structure which alkyl group may contain from about 1 to 20 carbon atoms and preferably less than about 10 carbon atoms. An example of this type of substitution would be benzyl, phenylethyl, phenylisopropyl and the like. Included within the invention are the acid addition salts of the above generalized group of compounds with any pharmaceutically acceptable acid such as will give rise to the corresponding acetate, citrate, benzoate, nitrate, sulfate, phosphate, benzenesulfonate and the like pharmaceutically suitable salts.

It has been discovered that the novel compounds of the foregoing structure possess anti-bacterial properties in general, and further exhibit activity of a hormonal nature, particularly estrogenic, in many instances, as well as having use in experimental pharmacology and as useful intermediates in the preparation of other steroids of therapeutic value.

When it is desired to adapt these novel compounds to pharmacological uses, they can be administered to an animal organism, including birds and mammals, in the form of creams, ointments, tablets, capsules, pills, solutions, suspensions for oral or parenteral use, and the like. The compounds are generally characterized by anti-bacterial activity against gram positive or gram negative microorganisms of various types which renders them useful for topical, local or systemic administration. When applied topically the compounds may, if desired, be used in a concentration ranging from about 0.1% to about 2.0% in the form of dusting powders, troches, sprays, drops, suppositories, aqueous or oil dispersions or in the form of ointments, creams, water-oil emulsions and lotions. For local treatment therefore they would be expected to be useful in combating gastro-intestinal infections. The usual excipients such as carboxymethylcellulose, lactose, starch and the like can be used where conventional compounding procedures and binders are employed to form tablets and pills. The general dosage range of such administration will vary with the age, degree of infection, etc. of the subject to be treated but will generally be of the order of not less than 200 mg./kilo of body weight per day.

The starting materials employed for the preparation of these novel compounds are generally 17-ketosteroids, particularly estrone, estrone methyl ether, estrone allyl ether, 3-alkanoyl esters of estrone and the like, to name a few selected members of the broad class of such compounds.

In general the reaction which leads to the preparation of these novel anti-bacterial agents involves a fusion reaction between cyanoguanidine and an appropriate cyclic ketosteroid of the type illustrated above. In most cases the cyanoguanidine may be admixed with the steroidal 17-ketone and the resulting mixture heated for half an hour or more at temperatures of the order of 200–300° C. If desired, suitable inert solvents of a broad class of aromatic solvents, including nitrobenzene, pyridine, and the like, may be added to the reaction mixture in order to reflux off the water formed during the reaction and lower the temperature of the reaction. After the product desired has been obtained in crude form, it may be purified by conventional techniques, such as washing with water followed by solution in acidified water, filtered, neutralized with base and precipitated. The precipitate may be recrystallized from such organic solvents as ethanol, petroleum ether, ethyl acetate, and butanol to name a few of such available solvents generally employed for this purpose.

The novel compounds of the invention may also be prepared by reaction of a compound such as guanidine with a steroid such as a 16-cyano-17-keto steroid, for example 16-cyano-estrone or the like, in the presence of an inert solvent at reaction temperatures ranging from 100–200° C. for up to 12 hours reaction time. Still further, one may react a compound such as a 16-cyano-estrone or the like with urea to form the 6'-amino-2'-hydroxy substituted analog which is further treated with a suitable halogenating agent such as POCl₃ to produce the 6'-amino-2'-halogeno analog which in a final step with ammonia to obtain the novel steroidal [17,16-d]-2',6'-diaminopyrimidine compounds of the invention.

In a still further method of preparation a steroid such as 16-(dichloromethyl)estrone or the like may be reacted in the presence of a suitable organic solvent at room temperature with guanidine to form 2'-amino-6'-chloro substituted analog in a first step which is then treated with ammonia to form the compounds of the invention herein.

The steroidal diaminopyrimidines derived from the reaction absorb characteristically near 283–284 millimicrons and also near 230 millimicrons on the spectrum when tested in ethanol.

As a specific example, the fusion reaction may be conducted in a reaction vessel heated in an oil bath at temperatures ranging from about 200–250° C. with air being displaced by nitrogen. The melted steroid and cyanoguanidine are miscible in most cases, although in some cases some phase separation may tend to occur. The reaction product solidifies upon cooling and is removed, ground, washed with water to remove melamine, which is also formed in the reaction, and is purified in the manner indicated above.

As illustrative of the antibacterial utility of the compounds produced as described above, two representative compounds were tested in vitro. One wherein R is hydrogen (represented by Compound A in the table below) and one wherein R is methyl (represented by Compound B in the table below) were tested against a variety of bacteria and fungi for bacteriocidal and fungicidal and bacteriostatic and fungistatic activity. The results may be tabulated as follows:

ANTIMICROBIAL ACTIVITY OF CERTAIN STEROIDAL [17,16-d]-2',6'-DIAMINOPYRIMIDINES

| Test Organism | Minimum Inhibitory Concentration, µg./ml. | |
|---|---|---|
| | A | B |
| Staphylococcus aureus 209P | 10 | 10 |
| Staphylococcus aureus 53–180 | 10 | 10 |
| Staphylococcus aureus CHP | 10 | 10 |
| Staphylococcus aureus J 144 | | 10 |
| Salmonella paratyphi | 50 | 10 |
| Brucella bronchiseptica | 50 | 25 |
| Neisseria catarrhalis | 50 | 25 |
| Lactobacillus casei | 25 | 25 |
| Bacillus subtillis 6633 | 25 | 10 |
| Bacillus subtillis SR | 250 | 25 |
| Escherichia coli 6880 | 500 | 1,000 |
| Escherichia coli SR | 500 | 1,000 |

The activity illustrated in the above table wherein the tabulated numerical values are the results of standard anti-microbial screening carried out by incorporating the test compound in agar in petri dishes at concentrations of 1000, 100 and 10 mcg. per ml. and streaking suspensions of microbial pathogens on the agar surface. The degree of inhibition of growth is observed after 72 hours at 28° C. Plain agar controls are also streaked with the test organisms and the results compared.

The term "minimum inhibitory concentration" as employed in the table above refers to the minimum amount of the particular steroidal diaminopyrimidine required to inhibit the growth of the particular microorganism inoculated upon the surface of a petri plate as indicated below. The measure of the value is taken after 18 hours at 28° C. and it represents the level at which the compounds prevent further growth of the microorganism.

In the above table the bacteria tested are cultured in an agar slant which is incubated at 37° C. for a period of 18–24 hours. From the stock slant obtained a subculture is made into a brain-heart infusion broth. The vessel containing the broth is incubated at 37° C. for an additional 18 hours. The broth formula is as follows:

Ingredient: G./liter
Calf brain infusion liquid _____ 200.0
Beef heart infusion liquid _____ 250.0
Peptone _____ 10.0
NaCl _____ 5.0
Disodium phospsate _____ 2.5
Dextrose _____ 2.0

The test organisms thus cultured are inoculated to the surface of the agar plates containing various concentrations of the compounds to be tested for activity.

The following examples describe in detail compounds illustrative of the present invention and methods for their manufacture. However, the invention is not to be construed as limited thereby either in spirit or in scope since it will be apparent to those skilled in the art of organic synthesis that many modifications both of materials and of methods may be practiced without departing from the purpose and intent of the disclosure. In the examples, except as otherwise noted, the temperatures are expressed in degrees centigrade and relative amounts of materials in parts by weight.

Example 1.—3-hydroxyestra-1,3,5(10)-trieno-[17,16-d]-2',6'-diaminopyrimidine

Mix 6.0 g. of estrone and 4.0 g. of cyanoguanidine in a test tube, from which a stream of nitrogen excludes the air. Place the mixture in a preheated oil bath (260°). Within 3–5 minutes the reactants melt. Stir the molten mass under nitrogen at 260° until bubbling ceases and the mass becomes viscous (5–7 minutes). Slurry-wash the cooled, powdered mass with warm (70°) water twice, then dissolve in 400 ml. of warm (70°) water acidified to pH 1 with concentrated hydrochloric acid. After filtering insolubles, cool the filtrate and neutralize with concentrated ammonium hydroxide, and filter the precipitated product. Repeat the solution and precipitation three more times, obtaining a crude produce weighting 3.9 g. Extract the pyrimidine with boiling ethyl acetate, and precipitate with petroleum ether, affording 536 mg. of purified pyrimidine, M.P. 320–330° dec.; $[\alpha]_D$ +100° (1%, MeOH); $\lambda_{max.}$ 283 m$\mu$ ($\epsilon$ 8,870), 230 m$\mu$ ( 15,600 shoulder), $\lambda_{min.}$ 257 m$\mu$ ($\epsilon$ 2,180);

$\lambda_{max.}^{KBr}$ 2.87, 2.97, 6.26, 6.69, 6.85, 7.02$\mu$, etc.

Analysis.—Calcd. for $C_{20}H_{24}ON_4 \cdot \frac{1}{3}H_{2}O$: C, 70.19; H, 7.25; N, 16.37. Found: C, 70.11; H, 7.24; N, 16.50.

Example 2.—3-methoxyestra-1,3,5(10)-trieno-[17,16-d]-2',6'-diaminopyrimidine

Hold a solution of 1.0 g. of 3-hydroxyestra-1,3,5(10)-trieno-[17,16-d]2',6'-diaminopyrimidine, 10.0 g. of potassium hydroxide, 25 ml. of water, and 25 ml. of methanol at 35° with stirring, and add 10 ml. of dimethyl sulfate over a period of 10 minutes. Continue stirring for 2 hours, at which time add 50 ml. of water. Stir for an additional 15 minutes and then filter the product (417 mg.). Recrystallize from boiling methanol to obtain 316 mg. of product, with a second crop of 45 mg. The pure product melts (Kofler block) 232–239° dec.; $[a]_D$ +92° (1% EtOH); $\lambda_{max.}$ 283 m$\mu$ ($\epsilon$ 8,160), 230 m$\mu$ ($\epsilon$ 16,300 shoulder), $\lambda_{min.}$ 257 m$\mu$ ($\epsilon$ 2,100):

$\lambda^{KBr}$ 2.92, 3.02, 3.14, 6.15, 6.33, 6.93$\mu$, etc.

Analysis.—Calcd. for $C_{21}H_{26}ON_4 \cdot H_2O$: C, 68.10; H, 7.68; N, 15.13. Found: C, 68.08; H, 7.61; N, 14.63.

Fusion of 1.0 g. of estrone methyl ether with 330 mg. of cyanoguanidine at 240° gives two layers of melted reactants. After cooling, extract the solids with hot water, and then extract the dried residue with acidified water (pH 1). On neutralization of the acid extract 95 mg. of 3-methoxyestra-1,3,5(10)-trieno-[17,16-d]-2',6'-diaminopyrimidine precipitates, identified by thin-layer chromatography and infrared spectra. The acid insoluble residue weighs 831 mg., and is identified as unaltered estrone methyl ether.

Example 3.—3-methoxyestra-1,3,5(10)-trieno-[17,16-d]-2',6'-diaminopyrimidine hydrochloride By reacting 5.0 g. of the compound of the preceding example with an equivalent amount of 1 N hydrochloric acid one can obtain the acid addition salt which comprises the product of this example.

*Example 4.—3-cyclopentyloxyestra-1,3,5(10)-trieno-[17,16-d]-2',6'-diaminopyrimidine*

Reflux a mixture of 1.0 g. of 3-hydroxyestra-1,3,5(10)-trieno-[17,16-d]-2',6'-diaminopyrimidine, 10 ml. of cyclopentyl bromide, 1 g. of sodium hydroxide, and 50 ml. of ethanol under nitrogen for 20 hours, after which time remove the solvents under vacuum. Wash the residue with 5% sodium hydroxide solution, and dissolve the purified residue in boiling methanol. After slight concentration, chill the solution and age overnight. The precipitated product may then be recovered by filtration.

*Example 5.—3-allyloxyestra-1,3,5(10)-trieno-[17,16-d]-2',6'-diaminopyrimidine*

Treat a solution of 500 mg. of 3-hydroxyestra-1,3,5(10)-trieno-[17,16-d]-2',6'-diaminopyrimidine in 30 ml. of ethanol with 5 ml. of allyl bromide and 500 mg. of sodium hydroxide, and reflux the mixture under nitrogen for 18 hours. Then remove the solvents under vacuum, and wash the residue with dilute sodium hydroxide solution. Dissolve the remaining insoluble product in boiling methanol, filter from a small amount of insoluble material, and concentrate somewhat. Allow the solution to stand at room temperature for 48 hours, after which time the precipitated product may be recovered by filtration.

*Example 6.—3-benzyloxyestra-1,3,5(10)-trieno-[17,16-d]-2',6'-diaminopyrimidine*

Reflux a solution of 500 mg. of sodium hydroxide, 10 ml. of benzyl bromide, 500 mg. of 3-hydroxyestra-1,3,5(10)-trieno-[17,16-d]-2',6'-diaminopyrimidine in 35 ml. of absolute ethanol under nitrogen for 14 hours, then remove the solvents under vacuum. Wash the solid residue several times with 5% sodium hydroxide solution, and take up the remaining insoluble material in boiling methanol. After filtering from insolubles, concentrate the methanol solution, and chill overnight. Filter the deposit of crystals, wash with cold methanol, and dry on the filter.

*Example 7.—3-acetoxyestra-1,3,5(10)-trieno-[17,16-d]-2',6'-diaminopyrimidine*

Dissolve 100 mg. of 3-hydroxyestra-1,3,5(10)-trieno-[17,16-d]-2',6'-diaminopyrimidine in 3 ml. of dry pyridine and add 1 ml. of acetic anhydride. Allow the mixture to stand at room temperature for 12 hours, after which time add methanol, and then remove the solvents under vacuum. Dissolve the residue thus obtained in methanol, add a small amount of toluene, and again remove the solvents under vacuum. Dissolve the recovered product in acetone, concentrate somewhat, and chill. Recover the precipitated product by filtration.

*Example 8.—3-phenoxyestra-1,3,5(10)-trieno-[17,16-d]-2',6'-diaminopyrimidine*

Reflux together a mixture of 500 mg. of 3-hydroxyestra-1,3,5(10)-trieno-[17,16-d]-2',6' - diaminopyrimidine, 500 mg. of sodium hydroxide, 10 ml. of bromobenzene, and 40 ml. of ethanol under an atmosphere of nitrogen for 20 hours. Remove the solvents under vacuum, and wash the solid residue with 5% sodium hydroxide solution. Then dissolve the washed solids in a large volume of boiling methanol, and concentrate until material begins to separate from solution. Then cool the mixture to cause the precipitation of solid product. Further purification of the product may be accomplished by repetition of the solution-precipitation process from methanol.

We claim:

1. A compound selected from the group consisting of those having the structural formula:

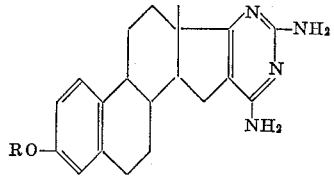

and the pharmaceutically acceptable acid addition salts thereof wherein R represents a substituent selected from the group consisting of hydrogen, lower alkyl, lower alkenyl, cycloalkyl of not more than 6 carbon atoms, phenyl, benzyl and lower alkanoxyl.

2. 3-hydroxyestra-1,3,5(10)-trieno-[17,16-d] - 2',6'-diaminopyrimidine.

3. 3-methoxyestra-1,3,5(10)-trieno-[17,16-d] - 2',6'-diaminopyrimidine.

4. A method for the preparation of a compound of claim 1 which comprises reacting a steroid selected from the group consisting of estrone, estrone alkyl ethers, and estrone esters with cyanoguanidine at a temperature in excess of 200° C. and less than 300° C.

5. A method according to claim 4 wherein the steroid reactant is estrone.

References Cited by the Examiner

UNITED STATES PATENTS 2,999,092  9/1961  Colton et al. _____ 260—239.5
3,026,317  3/1962  Ringold et al. _____ 260—239.5

LEWIS GOTTS, *Primary Examiner.*